United States Patent
Candelore

(10) Patent No.: US 6,363,149 B1
(45) Date of Patent: Mar. 26, 2002

(54) METHOD AND APPARATUS FOR ACCESSING STORED DIGITAL PROGRAMS

(75) Inventor: Brant L. Candelore, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/410,681

(22) Filed: Oct. 1, 1999

(51) Int. Cl.[7] .................................................. H04L 9/00
(52) U.S. Cl. ........................................... 380/45; 705/51
(58) Field of Search ........................ 380/45, 239, 240, 380/241, 242, 201, 202; 705/51, 57

(56) References Cited

U.S. PATENT DOCUMENTS

| | | | |
|---|---|---|---|
| 4,613,901 A | | 9/1986 | Gilhousen et al. |
| 4,700,387 A | * | 10/1987 | Hirata ........................ 380/239 |
| 5,485,577 A | | 1/1996 | Eyer et al. |
| 5,734,720 A | | 3/1998 | Salganicoff |
| 6,005,938 A | | 12/1999 | Banker et al. |

OTHER PUBLICATIONS

Schneier, Applied Cryptography, Oct. 1995, John Wiley and Sons, Inc., p. 53.*
International Search Report in connection with International Application No. PCT/US99/25819 (7 pages).
Applied Cryptography, Second Edition by Bruce Schneier, John Wiley & Sons,Inc., pp. v–xv and 1–74.

* cited by examiner

Primary Examiner—Gail Hayes
Assistant Examiner—Matthew Smithers
(74) Attorney, Agent, or Firm—Blakely, Sokoloff, Taylor & Zafman LLP

(57) ABSTRACT

A method for deriving past keys by using a one way function to relate an ordered sequence of keys to each other. In one embodiment, a method provides future access keys by creating a plurality of entitlement control messages, each entitlement control message including an access key for a given time period. In another embodiment, a method provides future access keys by creating an entitlement control message having a plurality of access keys corresponding to a plurality of time periods. In another embodiment, a method tracks an entitlement history by creating an entitlement management message having an entitlement time history field that includes information about whether a user has entitlement to view content recorded during a past time period. In another embodiment, the invention authorizes access to stored digital programs by determining whether a program is old, determining whether a user is authorized to view the old program, and if the user is not authorized, asking the user whether the user wants to access old programs, if the user wants to access old programs, displaying a plurality of payment options to the user.

14 Claims, 18 Drawing Sheets

|  | 1 KEY FOR ALL SERVICES | 1 KEY FOR ALL SERVICES | 1 KEY FOR ALL SERVICES |
|---|---|---|---|
| # OF PAST BILLING CYCLE TO RECOVER | 7 BYTES (SINGLE DES) | 14 BYTES (DOUBLE DES) | 21 BYTES (TRIPLE DES) |
|  | 7 | 14 | 21 |
| 2 | 14 | 196 | 4,116 |
| 3 | 21 | 294 | 6,174 |
| 6 | 42 | 588 | 12,348 |
| 9 | 63 | 882 | 18,522 |
| 12 | 84 | 1,176 | 24,696 |
| 18 | 126 | 1,764 | 37,044 |
| 24 | 168 | 2,352 | 49,392 |

|  | 10 KEYS | 1 KEY PER PACKAGE WITH 10 PACKAGES POSSIBLE | |
|---|---|---|---|
| # OF PAST BILLING CYCLE TO RECOVER | 7 BYTES (SINGLE DES) | 14 BYTES (DOUBLE DES) | 21 BYTES (TRIPLE DES) |
|  | 7 | 14 | 21 |
| 2 | 140 | 19,600 | 4,116,000 |
| 3 | 210 | 29,400 | 6,174,000 |
| 6 | 420 | 58,800 | 12,348,000 |
| 9 | 630 | 88,200 | 18,522,000 |
| 12 | 840 | 117,600 | 24,696,000 |
| 18 | 1260 | 176,400 | 37,044,000 |
| 24 | 1680 | 235,200 | 49,392,000 |

|  | 100 KEYS | 1 KEY PER SERVICE WITH 100 SERVICES POSSIBLE | |
|---|---|---|---|
| # OF PAST BILLING CYCLE TO RECOVER | 7 BYTES (SINGLE DES) | 14 BYTES (DOUBLE DES) | 21 BYTES (TRIPLE DES) |
|  | 7 | 14 | 21 |
| 2 | 1,400 | 1,960,000 | 4,116,000,000 |
| 3 | 2,100 | 2,940,000 | 6,174,000,000 |
| 6 | 4,200 | 5,880,000 | 12,348,000,000 |
| 9 | 6,300 | 8,820,000 | 18,522,000,000 |
| 12 | 8,400 | 11,760,000 | 24,696,000,000 |
| 18 | 12,600 | 17,640,000 | 37,044,000,000 |
| 24 | 16,800 | 23,520,000 | 49,392,000,000 |

FIG. 4

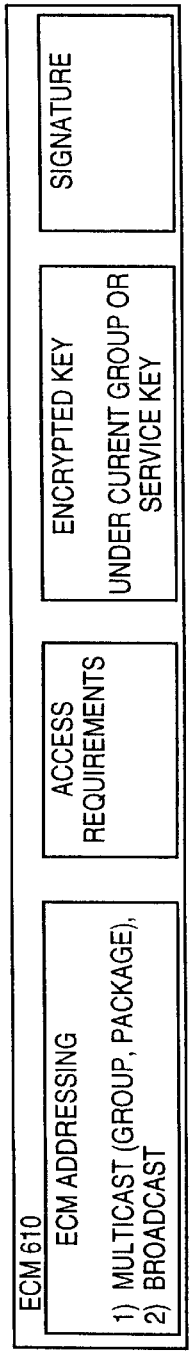

YOU ARE NOT AUTHORIZED TO ACCESS OLD PROGRAMS.

DO YOU WISH TO RECEIVE AUTHORIZATION?

FIG. 9A

YOU ARE NOT SUBSCRIBED TO THE PROGRAM.

HOW DO YOU WISH TO VIEW THE MOVIE?

SELECT ONE OF THE FOLLOWING:

A) IMPULSE PAY-PER-VIEW     - IT COST $1.50 YOU HAVE $27.45 CREDIT.

B) SUBSCRIPTION TO PAST SERVICE - IT COSTS $6.50 FOR JAN 1999 TO JUN 1999.

CURRENT DATE: FEB 15, 2003

FIG. 9B

YOU ARE NOT SUBSCRIBED TO THE PROGRAM.

WHAT DO YOU WISH TO DO?

SELECT ONE OF THE FOLLOWING:

A) PURCHASE ACCESS TO LAST 6 MOS OF PROGRAMS - IT COST $6.50
            YOU HAVE $27.45 CREDIT.

B) PURCHASE ACCESS TO LAST 12 MOS OF PROGRAMS - IT COST $8.50
            YOU HAVE $27.45 CREDIT.

C) PURCHASE ACCESS TO LAST 24 MOS OF PROGRAMS - IT COST $10.50
            YOU HAVE $27.45 CREDIT.

FIG. 9C

PAST SERVICE AUTHORIZATION

|  | JAN-JUN 1999 | JUL-DEC 1999 | JAN-JUN 2000 | JUL-DEC 2000 | JAN-JUN 2001 | JUL-DEC 2001 |
|---|---|---|---|---|---|---|
| HBO |  |  |  |  |  |  |
| SHOWTIME |  |  | ▨ |  | ▨ | ▨ |
| TURNER |  |  | ▨ |  | ▨ | ▨ |
| DISNEY | ▨ | ▨ | ▨ |  |  |  |
| TVN | ▨ |  | ▨ |  |  |  |
| PLAYBOY | ▨ |  | ▨ |  |  |  |
| DISCOVERY | ▨ |  |  |  |  |  |

| | |
|---|---|
| ▨ | AUTHORIZED |
|  | NOT AUTHORIZED |

FIG. 9D

METHOD AND APPARATUS FOR ACCESSING STORED DIGITAL PROGRAMS

FIELD OF THE INVENTION

The present invention relates to program viewing units such as set top boxes used in entertainment systems. More specifically, the present invention relates to a method and apparatus for scrambling program data such that the program data may be de-scrambled for viewing at a future time without experiencing the problems associated with key expiration.

BACKGROUND OF THE INVENTION

Analog communication systems are rapidly giving way to their digital counterparts. Digital television is currently scheduled to be available nationally to all consumers by the year 2002 and completely in place by the year 2006. High-definition television (HDTV) broadcasts have already begun in most major cities on a limited basis. Similarly, the explosive growth of the Internet and the World Wide Web have resulted in a correlative growth in the increase of downloadable audio-visual files, such as MP3-formatted audio files, as well as other content.

Simultaneously with, and in part due to, this rapid move to digital communications system, there have been significant advances in digital recording devices. Digital versatile disk (DVD) recorders, digital VHS video cassette recorders (D-VHS VCR), CD-ROM recorders (e.g., CD-R and CD-RW), MP3 recording devices, and hard disk-based recording units are but merely representative of the digital recording devices that are capable of producing high quality recordings and copies thereof, without the generational degradation (i.e., increased degradation between successive copies) known in the analog counterparts. The combination of movement towards digital communication systems and digital recording devices poses a concern to content providers such as the motion picture and music industries, who desire to prevent the unauthorized and uncontrolled copying of copyrighted, or otherwise protected, material.

In response, there is a movement to require service providers, such as terrestrial broadcast, cable and direct broadcast satellite (DBS) companies, and companies having Internet sites which provide downloadable content, to introduce protection schemes. Two such copy protection systems have been proposed by the 5C group of the Data Hiding Sub Group (DHSG) (5C comprising representatives of Sony, Hitachi, Toshiba, Matsushita, and Intel) and the Data Transmission Discussion Group (DTDG), which are industry committee subgroups of the Copy Protection Technical Working Group (CPTWG). The CPTWG represents the content providers, computer and consumer electronic product manufacturers.

The DTDG Digital Transmission Copy Protection (DTCP) proposal is targeted for protecting copy-protected digital content, which is transferred between digital devices connected via a digital transmission medium such as an IEEE 1394 serial bus. Device-based, the proposal uses symmetric key cryptographic techniques to encode components of a compliant device. This allows for the authentication of any digital device prior to the transmission of the digital content in order to determine whether the device is compliant. The digital content is itself encoded prior to transmission so that unauthorized copying of the content will result in copy having an unintelligible format.

One method of encoding the content has been proposed by the DHSG, and is based on watermarking techniques. Although the main focus of the DHSG proposal has been for copy protection of digital movie and video content, particularly as applied to DVD systems, it is expected to be applicable to the copy protection of any digital content distributed electronically via digital broadcasts and networks. The watermarking techniques, which are invisible to the user, allow the incoming content to be marked in a manner that makes it extremely difficult to discern precisely how the content was encoded, and thus extremely difficult to remove or alter the watermark without damaging the content. The DHSG has determined three primary cases of detection and control that such a technology should accomplish: playback, record and generational copy control. It is anticipated that the watermarking technology will allow the content provider to specify at least whether the content is "copy never," "copy once," and "copy free" content. "Copy never" is used to mark digital content to indicate that the content is not allowed to be copied, while "copy free" indicates that the content may be copied freely and which can be marked with additional information. This is different than material that is never marked. Finally, "copy once" is used to indicate that the digital content is allowed to be copied only once. As a copy is being made, the original "copy once" content and the newly copied content are re-marked with "no more copy." Of course, other types of copy management commands may limit the playing or reproduction of such digital content; for example, to a specific period of time, duration, or number of plays or viewings.

Thus, even today, the functionality of digital devices such as set-top boxes, digital televisions, digital audio players, and similar such digital devices extends beyond their historical role of conditional access (CA), i.e., merely de-scrambling content to a CA-clear format for real-time viewing and/or listening, and now include constraints and conditions on the recording and playback of such digital content.

Currently, copying of scrambled content for subsequent de-scrambling and viewing or listening may be permitted with the appropriate service/content provider authorization or key provided to the digital device For example, service providers, such as terrestrial broadcast, cable, and direct broadcast satellite (DBS) companies, regulate program data delivered to viewers by encoding the program data using a variety of key delivery methods. A common key delivery method involves scrambling the content in program data with keys and control words. In this method, the content in the program data may be scrambled using control words that may change periodically over time during the broadcast. The control words are delivered into entitlement control messages in the program data and scrambled using a key injected in the entitlement management messages in the program data. In order to de-scramble the content, the key must be derived and used to de-scramble the control words. The control words are then applied to de-scramble the content.

Viewers may be allowed to record program data with content in a scrambled format and have the content de-scrambled and displayed at a later time. Program viewing units such as set top boxes may be designed to regulate the de-scrambling of the recorded content in the program data such that a record of the de-scrambling may be made and reported to the service providers. This allows the service providers to monitor the usage of program data by viewers and to bill the viewers. Program viewing units may be configured with key management functions that support special revenue features such as pay per-view, pay-per play, pay-per-time, and other features.

A drawback of the current key delivery methods is that the service providers change the keys used to scramble control words periodically. Thus, a program viewing unit may only de-scramble content in the program data if the current key provided by the service provider is the same as they key used to scramble control words in the recorded program data. De-scrambling of content may not be achieved by the program viewing unit after the key used to scramble the control words in the recorded program data expire.

SUMMARY

In one embodiment, the present invention provides a method for deriving past keys by using a one way function to relate an ordered sequence of keys to each other. In another embodiment, the present invention provides a method for providing future access keys by creating a plurality of entitlement control messages, each entitlement control message including an access key for a given time period. In another embodiment, the present invention provides a method for providing future access keys by creating an entitlement control message having a plurality of access keys corresponding to a plurality of time periods.

In another embodiment, the present invention provides a method for tracking an entitlement history by creating an entitlement management message having an entitlement time history field that includes information about whether a user has entitlement to view content recorded during a past time period.

In another embodiment, the present invention provides a method for authorizing access to stored digital programs by determining whether a program is old, determining whether a user is authorized to view the old program. If the user is not authorized, the user is asked whether the user wants to access old programs, and if the user wants to access old programs, displaying a plurality of payment options to the user.

BRIEF DESCRIPTION OF THE DRAWINGS

The present invention is illustrated by way of example and not by way of limitation in the figures of the accompanying drawings, in which like references indicate similar elements and in which:

FIG. 4 is a diagram showing one embodiment of the storage requirements for keys.

FIG. 6A shows an embodiment of an entitlement control message.

FIGS. 6B, 6C, 6D and 6E show embodiments of entitlement control messages that include future keys.

FIGS. 9A, 9B, 9C and 9D show embodiments of the present invention for authorizing access to stored digital programs.

DETAILED DESCRIPTION

Figure 1:
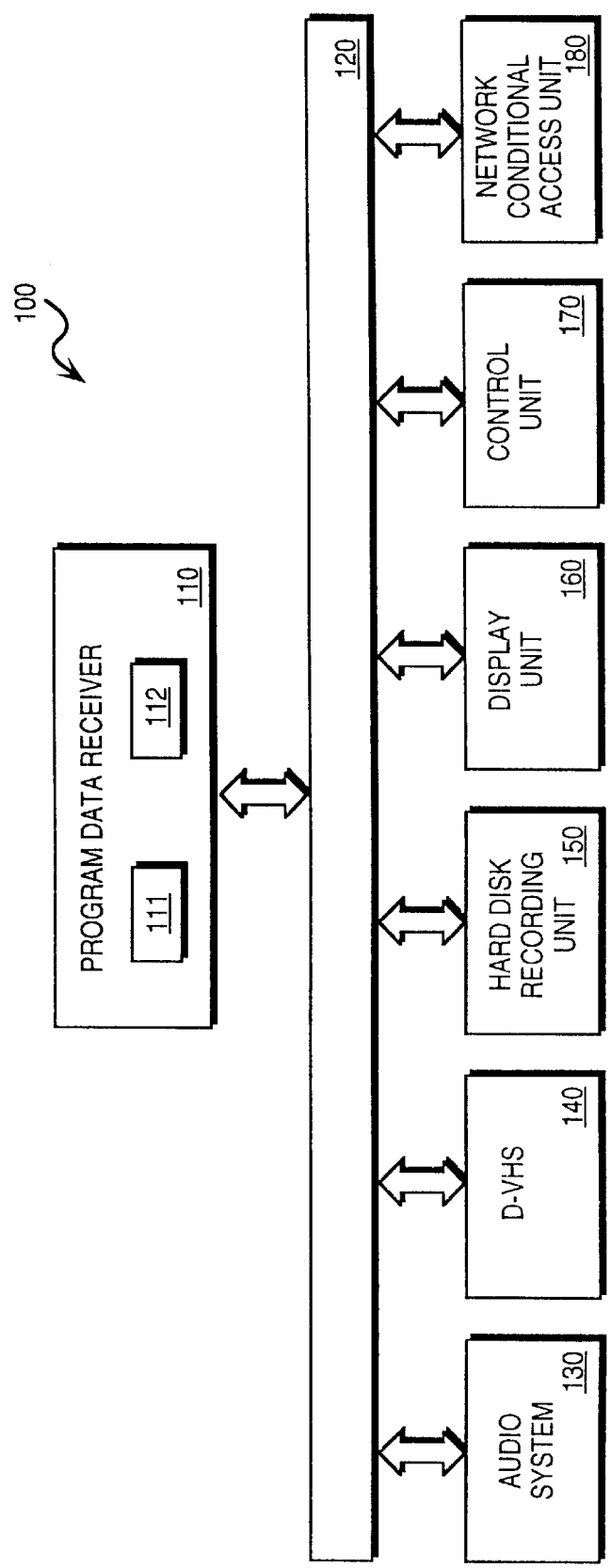
FIG. 1 is a block diagram of an entertainment system according to an embodiment of the present invention.

FIG. 1 is a block diagram of an entertainment system 100 including one embodiment of the copy management system of the present invention. The entertainment system 100 includes a digital device 110 for receiving a digital bitstream including program data from one or more service providers. Such service or content providers can include terrestrial broadcasters, cable operators, direct broadcast satellite (DBS) companies, companies providing content for download via the Internet, or any similar such content and/or service provider. The program data may include system information, entitlement control messages, entitlement management messages, content, and other data, each of which will be described briefly. System information may include information on program names, time of broadcast, source, and a method of retrieval and decoding, and well as copy management commands that provide digital receivers and other devices with information that will control how and when program data may be replayed, retransmitted and/or recorded. These copy management commands may also be transmitted along with entitlement control messages (ECM), which are generally used by the conditional access unit to regulate access to a particular channel or service. Entitlement management messages (EMM) may be used to deliver privileges to the digital receiver 111 such as rights and descrambling keys. A decryption key is generally a code that is required to restore scrambled data, and may be a function of the rights granted. Finally, content in the program data stream may include audio and video data, which may be in a scrambled or clear format.

The digital device 110 includes a digital receiver 111, which processes the incoming bitstream, extracts the program data therefrom, and provides the program data in a viewable format. The thus extracted program data is then provided to a decoding unit 112 for further processing, including separation of the system information from the content, as well as decoding, or decompressing, of the content to its original form. The digital receiver 111 also regulates access to the program data by other components on the entertainment system 100, and according to one embodiment of the present invention, supports the simultaneous transmission of program data having content in a de-scrambled format (hereinafter referred to as "descrambled content") and program data having content in a scrambled format (hereinafter referred to as "scrambled content").

According to one embodiment, the digital device 110 is a digital television set where the digital receiver 111 is a set-top box integrated therein, and the decoding unit 112 is an MPEG (Motion Picture Experts Group) decoder. The digital television set's display (not shown) is, according to this embodiment, integrated within the digital device 110. Alternatively, it will be appreciated that the digital device 110 may include only the digital receiver 111 and/or the decoder unit 112, with a display being external to the decoding device 110. An example of this embodiment would be an integrated receiver/decoder (IRD) such as a stand-alone set-top box which outputs NTSC, PAL or $Y_pB_p$ signals. All such embodiments are included within the scope of the present invention.

Digital device 110 may be coupled to other components in the entertainment system 100 via a transmission medium 120. The transmission medium 120 operates to transmit control information and data including program data between the digital device 110 and other components in the entertainment system 100. It will be appreciated that the entertainment system 100 of FIG. 1 is merely an exemplary embodiment, and that other analog and/or digital components may be ad ded or substituted for the components briefly described hereinafter.

Referring to FIG. 1, the entertainment system 100 may include an audio system 130 coupled to the transmission medium 120. The audio system 130 may include speakers and an audio player/recorder such as a compact disc player, a Sony MiniDisc® player, or other magneto-optical disc that may be used to play and/or record audio data. A digital VCR 140, such as a D-VHS VCR, may also be coupled to the digital device 110 and other components of the entertainment system 100 through the transmission medium 120. As known, the digital VCR 140 may be used to record analog or digital audio, video, and other data transmissions , and accordingly an embodiment of the present invention, may be used to record program data received by the digital device 110 and transmitted to the digital VCR over transmission medium 120.

A hard disk recording unit 150 may also be coupled to digital device 110 and other components via transmission medium 120 . The hard disk recording unit 150 may be a personal computer system, a stand-alone hard disk recording unit, or other hard disk recording device capable of recording analog or digital audio, video and data transmissions. As with digital VCR 140, according to one embodimient of the present invention, the hard disk recording unit 150, may be used to record program data received by the digital device 110 and transmitted to the hard disk recordi ng unit 150 over transmission medium 120.

Display 160 may include a high definition television display, a monitor or other device capable of processing digital video signals. In an embodiment where the digital device 110 is a stand-alone set-top box, display 160 may be a digital television set.

Finally, a control unit 170 may be coupled to the transmission medium 120. The control unit 170 may be used to coordinate and control the operation of some or each of the components on the entertainment system 100, as well and other electronic devices remotely coupled thereto.

Figure 2:
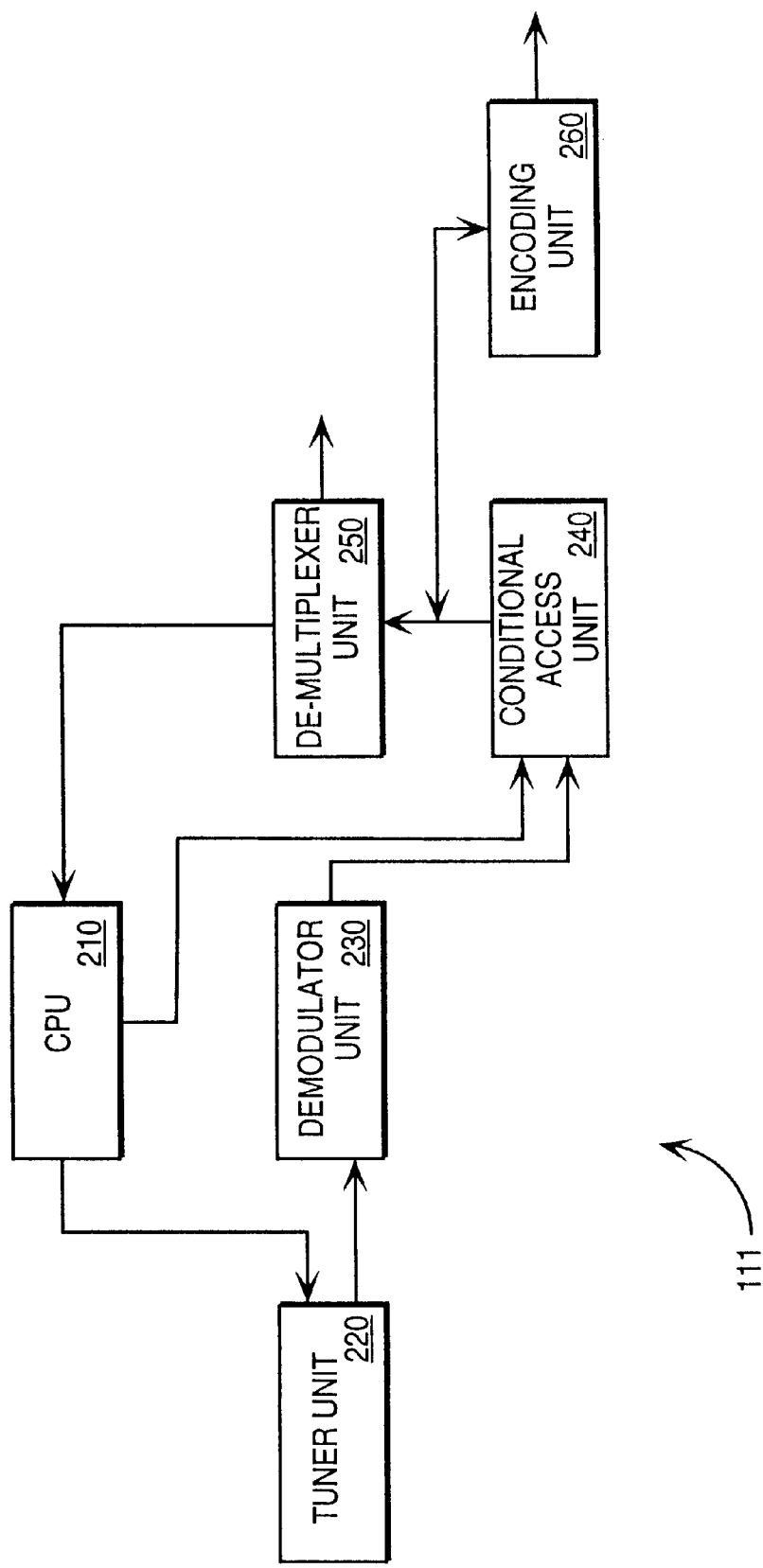
FIG. 2 is a block diagram of a program viewing unit according to an embodiment of the present invention.

FIG. 2 is a block diagram of one embodiment of the digital receiver 111 including the copy management system according to the present invention. The digital receiver 111 includes a central processing unit (CPU) 210, which controls the overall operation of the digital receiver 111, and determines the frequency in which a selected channel is broadcast or otherwise transmitted. This information is then transmitted to a tuner 220, which then selects the appropriate frequency of the terrestrial, cable, satellite, or Internet transmission in which to receive the incoming digital bitstream, including program data. The CPU 210 may also support a graphical user interface (GUI), such as an electronic programming guide (EPG), the latter allowing a user to navigate through various channels and program options to select a desired channel or program for viewing, listening, recording and the like. The GUI may be displayed on either a display (not shown) of digital device 110 (e.g., where digital device 110 is a digital television set), or on display 160 (e.g., where digital device 110 is a stand-alone set-top box).

Once the tuner 220 has selected the appropriate frequency, it amplifies the incoming digital bitstream, and provides the output bitstream to a demodulator unit 230. The demodulator unit 230 receives the bitstream from the tuner 220 and demodulates the bitstream to provide program data as originally transmitted. The type of demodulation effected by the demodulator unit 230 will of course depend on the type of transmission as well as the modulation process used in the transmission process. For example, in the case of cable transmissions and Internet transmissions received over cable modems, the demodulator unit 230 may perform quadrature amplitude demodulation (QAD), while for satellite broadcasts, quadrature phase shift key (QPSK) demodulation will likely be required. Terrestrial broadcasts, will likely require vestigial side band (VSB) demodulation. The present invention is not limited to any one type of transmission and modulation/demodulation scheme, and other schemes are within the scope and spirit of the present invention. In addition to effecting the demodulation process, demodulator unit 230 may also perform error icorrection on the received bitstream.

The thus demodulated bitstream is now preferably provided to a conditional access unit 240. (That portion of the demodulated bitstream that is not encrypted may bypass the conditional access unit 240 and be provided directly to the demultiplexer 250 as shown by the dashed lines in FIG. 2. This might also be the case where none of the bitstream needs decrypting, and/or where there is no conditional access module). The conditional access unit 240 generally performs key management and decryption, as well as de-scrambling functions as follows.

Typically, if the CPU 210 determines that the program data in the digital bitstream includes scrambled content, that program data is provided to a conditional access unit 240. At this point the CPU 210 may transmit packet identifier (PID) information to the conditional access unit 240, such PID information informing the conditional access unit 240 where in the program data the ECM may be found. The CPU 210 may instead receive the ECM and deliver it to the conditional access unit 240. Alternatively, the conditional access unit 240 may have demultiplexing capabilities allowing it to directly obtain the location of the ECM from the bitstream itself. As discussed previously, the ECMs regulate a user's access to a particular channel or service, and determines the access rights that are needed to be held by a receiver 111 in order to grant access. The ECMs may also be used to deliver a decrypting or de-scrambling key or to deliver information (e.g., an algorithm) as to how to derive a key that may be used to de-scramble scrambled content. Using such key or information regarding derivation of such key, the conditional access unit 240 may de-scramble the content contained in the program data. Alternatively, the conditional access unit may provide the key to the demultiplexer 250 which will perform the de-scrambling.

Importantly, although the conditional access unit 240 is shown as an integral, or embedded, in that both the de-scrambling and decrypting functions are effected internally in receiver 111, the conditional access unit may also split or external. An external conditional access unit de-scrambles the program data content and decrypts the keys externally; e.g., as is the case with the National Renewable Security System (NRSS) conditional access modules. In a split conditional access unit, the program data content is de-scrambled within the digital receiver 111, while the key decryption is completed externally, e.g., via a "smart card." All of these systems are intended to be within the spirit and scope of the present invention.

Once the conditional access unit 240 de-scrambles the program data content, the program data is input to demultiplexer unit 250, which separates the system information from the content in the program data. According to an embodiment of the demultiplexer unit 250, the demultiplexer unit 250 parses the program data for PIDs that are associated with system information, audio information, and video information, and then transmits the system information to the CPU 210 and the audio and video information to the decoder unit 112. In accordance with one embodiment of the present invention, a encoding unit unit 260 is coupled to the conditional access unit 240. Operation of this unit, which allows the receiver 111 to communicate with other digital components in the entertainment system 100, will be discussed at a later point.

The CPU 210, tuner 220, demodulator unit 230, conditional access unit 240, demultiplexer unit 250, and encoding unit unit 260 may be implemented using any known technique or circuitry. In one embodiment of the present invention, the CPU 210, tuner 220, demodulator unit 230, demultiplexer unit 250, and encoding unit unit 260 all reside in a single housing, while the conditional access unit 240 resides in an external NRSS conditional access module (as discussed above). In NRSS, the conditional access unit can take the form factor of either a Personal Computer Memory Card International Association (PCMCIA) or smart card.

Figure 3:
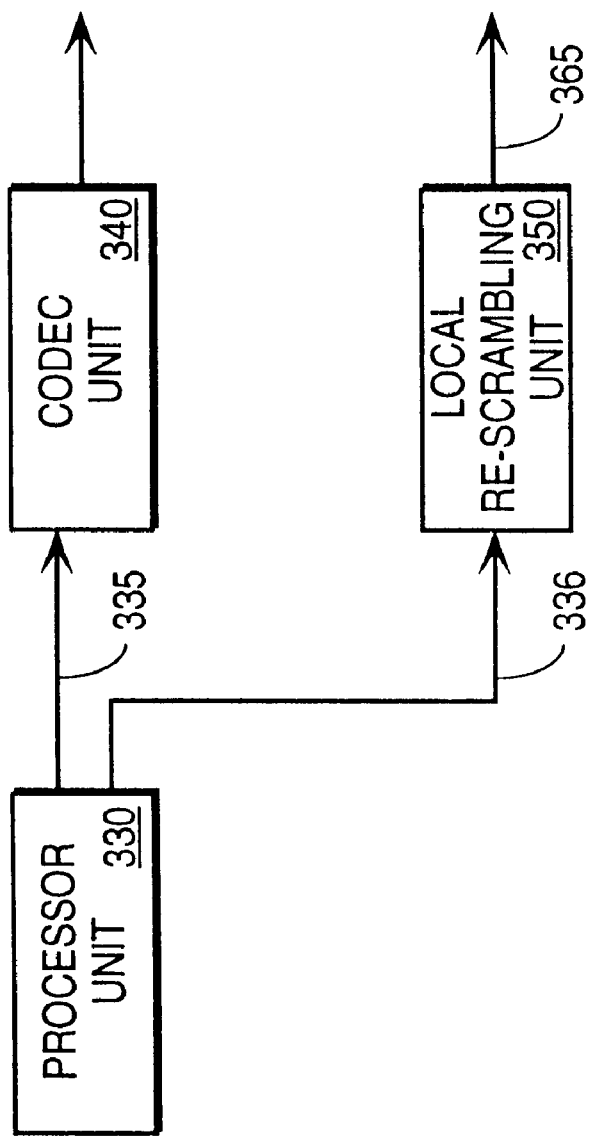
FIG. 3 is a block diagram of a conditional access unit according to an embodiment of the present invention.

FIG. 3 shows a block diagram of one embodiment of the conditional access unit 240 of the copy management system of the present invention. The conditional access unit 240 includes a processor unit 330, which receives the demodulated program data from the demodulator unit 230 and obtains PID information identifying where ECMs may be found in the program data. Again, this packet identifier information may be provided by the CPU 210 or obtained directly from the bitstream by the conditional access unit 240 itself. It is also possible for the CPU 210 to deliver ECMs to the conditional access unit 240.

In one embodiment of the present invention, the processor unit 330 processes the ECMs and derives a key for de-scrambling the content. The processor unit 330 then outputs program data and the key to a de-scrambler unit 340 over line, pin or set of pins. The de-scrambler unit 340 receives the key and the program data off line 335 and processes the program data, including de-scrambling or decrypting the program data content with the key. The de-scrambler unit 340 then transmits the program data with the now clear content over line, pin or set of pins to the demultiplexer unit 250 (FIG. 2), and then to the decoding unit 112, and finally for display and viewing by a user.

The de-scrambler unit 340 also transmits the program data with the now clear content over line, pin or set of pins to a re-scrambler unit 350. The re-scrambler unit 350 receives the program data and processes the data, including re-scrambling the clear content. Re-scrambling can use a similar algorithm as used in the de-scrambling process. For example, if DES could be used for both the de-scrambling and re-scrambling processes.

(It will be appreciated that although for ease of understanding, the processor unit 330, the de-scrambler unit 340, and the re-scrambler unit 350 are shown as separate elements in FIG. 3, these elements may be integrated in one device, or may be implemented using any known circuitry or technique).

The re-scrambler unit 350 may re-scramble the content in any one of several ways. For example, in one embodiment of the copy management system of the present invention, it may re-scramble the content using the ECMs originally transmitted in the received bitstream and received in receiver 111. Alternatively, separate re-scrambling keys may be transmitted in the original bitstream in separate ECMs and extracted by the re-scrambler unit 350 from the program data received from the de-scrambler unit 340. In another embodiment of the copy management system of the present invention, the re-scrambler unit 350 may have encrypting or encoding capabilities, allowing it to re-scramble the content using a local key which may be unique to receiver 111. Such a key would not be delivered using an ECM, but could be delivered to the re-scrambler unit 350 using an EMM. Alternatively, the key could be a non-changeable key which has been created at the time of manufacture of the re-scrambler unit.

In yet another embodiment of the present invention, control words may be used in addition to keys. In such embodiment, the control words are first scrambled using a key, and then are inserted into the bitstream program data prior to transmission. Under this method, in order to de-scramble the content in the program data, the control access unit 240 must first derive the key (using any of the aforementioned methods) and then use the derived key to de-scramble the control words. The de-scrambled control words are then applied to de-scramble the content. This method gives added flexibility and security in the transmission, particularly in the case where a local key is used (i.e., located in the receiver 111), in that the control words (and thus access rights) may be changed periodically without requiring a change of the local key. Using this method, the re-scrambler unit 350 may scramble the content using one of several methods. The re-scrambler unit 350 may use the originally transmitted control words and key to re-scramble the control words. Alternatively, the re-scrambler unit 350 may use local control words and keys that are unique to the receiver 111. It will be appreciated to those skilled in the art that any one of the aforementioned methods of scrambling and de-scrambling may be used alone or in combination, and these and other similar methods are intended to be within the scope and spirit of the present invention.

Once the content is re-scrambled, the program data including the re-scrambled content is transmitted over line, pin or set of pins 355 (hereinafter, "line 355"). In one embodiment of the present invention, the re-scrambled program data is output over encoding unit unit 260, as shown in FIG. 2. The encoding unit unit 260 encodes this program data with copy management commands that indicate that the program data is "copy free." The encoding unit unit 260 interfaces with the components on the transmission medium 120 (shown in FIG. 1) to determine which components are authorized to decode the encoded program data, and then transmits a key to the authorized components for decoding the encoded program data. According to one embodiment of the entertainment system 100, the encoding unit unit 260 initiates an authentication process that identifies devices that are authorized to decode encoded program data, and then encodes program data transmitted on the IEEE 1394 transmission medium using the DIDG's DTCP encoding scheme. It will be appreciated, however, that other encoding schemes may be implemented without detracting from the spirit and scope of the invention.

Thus, as line transmits the clear content to the demultiplexer unit 250 for display on a display which is either integral with, or directly connected to, digital device 110, and line carries the re-scrambled content over transmission medium 120 for recording on one or more of any of several components connected to the transmission medium 120, the conditional access unit 240 allows the user to simultaneously view a program in the clear while recording the scrambled version. It will be appreciated that, under this embodiment, the content provider can control when and if the user can copy or even view the content again given that the rescrambled stream which is output over line 345 must be de-scrambled with the appropriate keys and/or control words before viewing, and thus must be processed by the conditional access unit 240.

The scrambled digital content may be recorded by a user in its scrambled format. There are several reasons for doing this. For example, permission to record the clear content of a program may not have been granted by the content provider even if it is marked with "copy never" attributes, but time shifting is desired. Alternatively, an entire digital transport stream is recorded containing a number of programs, only one of which may be descrambled and viewed at any one time. By playing back the scrambled content, unwatched portions of the stream may be accessed by descrambling and watching the unseen portion of the content. Finally, by recording the scrambled content locally, key management of special revenue features may be better controlled, such as pay-per-view, pay-per-time, delayed impulse pay-per-view (IPPV), repurchase of "copy never" movies, and personal scrambling that provides enhanced security.

The information used to descramble the content is provided by a key. This key information may be encrypted. The key, along with the information needed to decrypt the key, are sent to the conditional access 240 in an entitlement management message, or in an entitlement control message. If either of these messages are modified, the key information will also be modified and rendered useless. The key information may change on a regular basis, for example, a monthly basis tied to a customer's billing cycle.

One problem with changing the keys over time is storing the keys. The keys from older time periods must be stored, otherwise, access to the scrambled content of a program recorded using a previous key will be denied. Of course it may be possible to save the key information for older time periods by storing the old keys. Descrambling recorded content from two different time periods would require storing two keys. In addition, some CA systems have a unique key for each service. In a system that requires a separate key for each service, the storage requirements can become huge if it is desired to recover programs recorded to tape for any of the services. The storage requirements increase greatly as the number of keys for different time periods and services increases, as shown in FIG. 4.

Figure 5A:
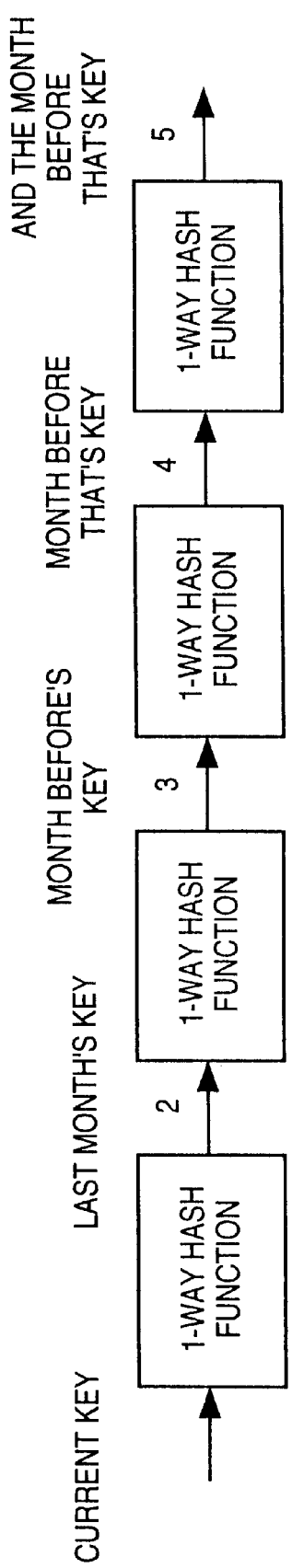
FIGS. 5A and 5B show embodiments of methods of using a current key to derive past keys.

FIG. 5A shows one embodiment of a method of deriving past keys in order to reduce the storage requirements for keys. The keys are related to one another by a one way function. A previous key is hash of current key. If the conditional access unit has possession of the current key, it can determine previous keys that correspond to previous time periods. However, keys corresponding to future time periods cannot be determined or derived from the current key, because the keys are related in only one way. In this embodiment, the one way that the keys are related is from a current key to previous keys. In this way, by having the current key, a conditional access unit is able to hash and derive previous keys in order to descramble previously stored scrambled programming.

In this embodiment, all of the possible keys may be computed ahead of time. For example, if a key were to change once a month for ten years, the one way function would need to be invoked 120 times (12 times per year*10 years). The key that would be used first is the very last key computed. A system may run the hashing algorithm a thousand times, which would provide more than enough keys for at least 80 years at the rate of one key used per month.

Figure 5B:
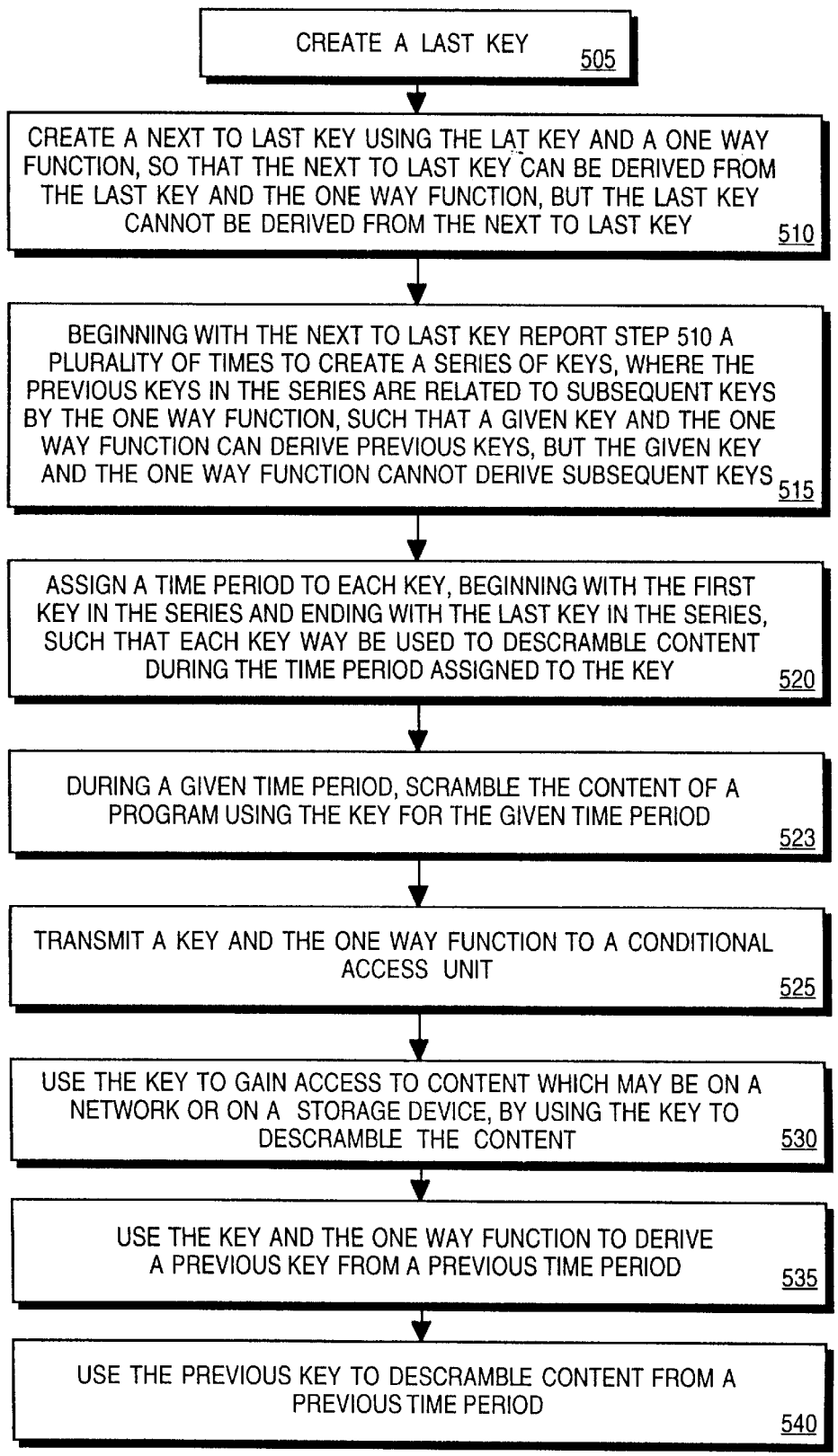

FIG. 5B shows a flow diagram of one embodiment of the method for creating and using these keys. In step 505, a last key is created. The last key and a one way function are used to create a next to last key, 510, so that the next to last key can be derived from the last key and the one way function, but the last key cannot be derived from the next to last key. This process is then repeated a plurality of times, to create a series of keys, 515. The previous keys in the series are related to subsequent keys by the one way function, such that a given key and the one way function can derive previous keys, but the given key and the one way function cannot derive subsequent keys. A time period is assigned to each key, beginning with the first key in the series and ending with the last key, such that each key may be used to descramble content during the time period assigned to the key, 520. During a given time period, the content of a program is scrambled and delivered to a user, 523. A key and the one way function are transmitted to a conditional access unit, 525. The key is used to gain access to the content which may be on a network or on a storage device, by using the key to descramble the content, 530. The key and the one way function are used to derive a previous key from a previous time period, 535. The previous key is used to descramble content from a previous time period, 540.

Examples of hashing algorithms that may be used to generate the keys include the secure hash algorithm (SHA) and media digest 5 (MD5). The digital encryption standard (DES) may also be used to create a secure hashing function.

FIGS. 6B through 6E show embodiments for recording future access keys. FIG. 6A shows a conventional entitlement control message. The key used to descramble the content is encrypted under the current group or service key, which is sent in the ECM 610. The scrambled content may be recorded. However, the key may expire after a period of time. If a customer tries to view the recorded scrambled content at a later time, the conditional access element may not be able to recover the content if the key has expired. This is how payment is enforced by the service provider.

FIG. 6B shows one embodiment of entitlement control messages (ECMs) that contain fields encrypting future delivered group or service keys. In this embodiment, multiple ECMs are created and recorded along with the content. Each ECM 660 contains a key that corresponds to a given time period. In FIG. 6B, time X is the current key epoch, while time X–1 is the next epoch. If a customer were authorized to view an entire year of content, and if keys changed on a monthly epoch basis, then 12 different ECMs could be generated, included in the data stream, and recorded along with the content. Thus, a customer could record the content, and still have access to view the content for one year.

Figure 6C:
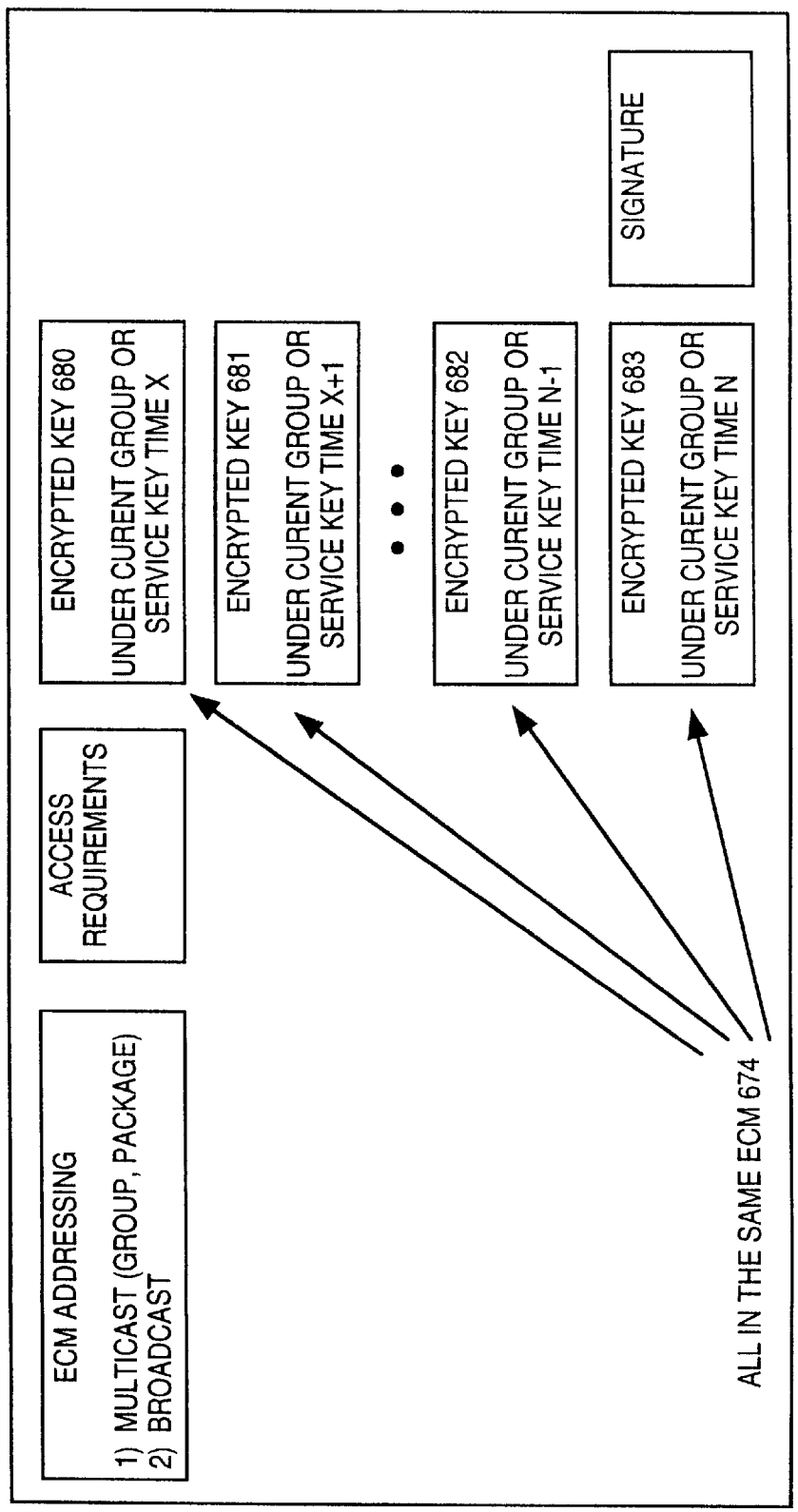
Figure 7A:
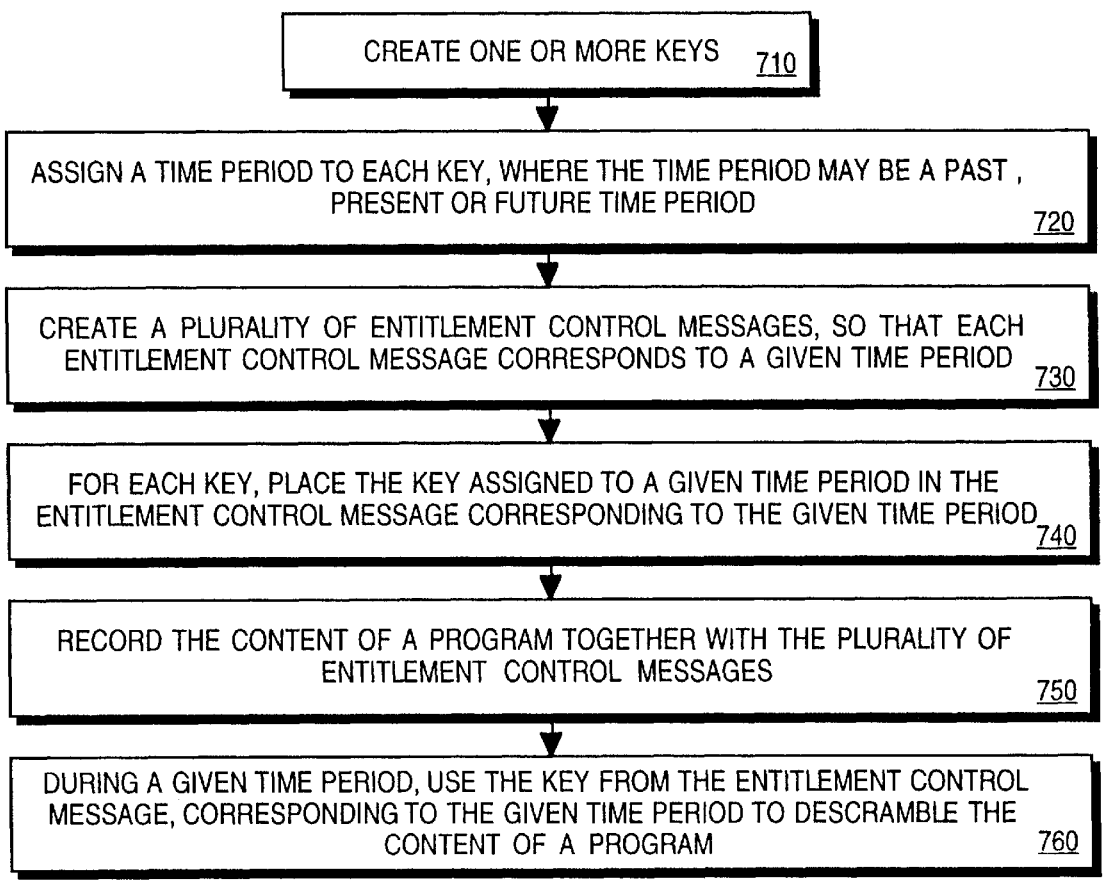
FIGS. 7A and 7B show embodiments of creating entitlement control messages that include future keys.

FIG. 7A shows a flow diagram for one embodiment of creating the ECMs of FIG. 6B. One or more keys are created, 710. A time period is assigned to each key, where the time period may be a past, present, or future time period, 720. A plurality of entitlement control messages are created so that each entitlement control message corresponds to a given time period, 730. For each key, place the key assigned to a given time period in the ECM corresponding to the given time period, 740. The content of a program, together with the plurality of ECMs, are recorded, 750. During a given time period, the key from the ECM that corresponds to the given time period is used to descramble the content of a program, 760.

Figure 6D:
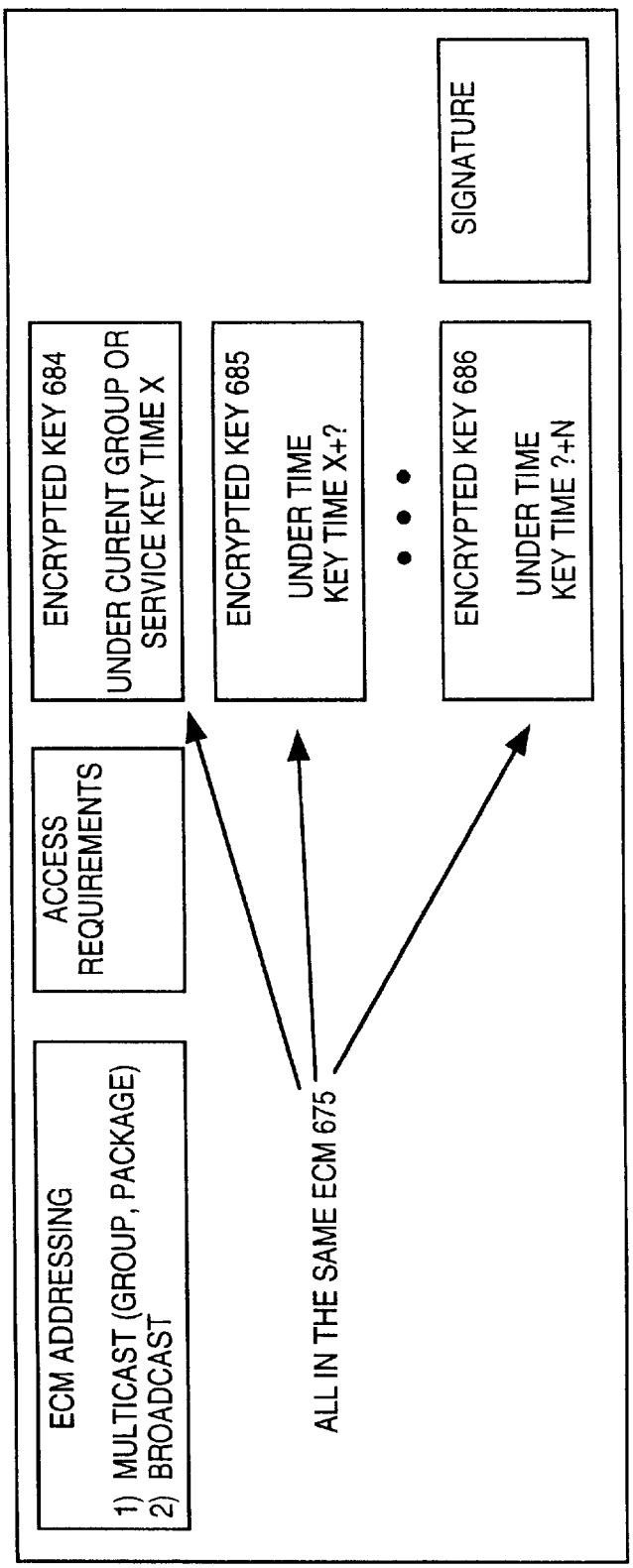

FIGS. 6C and 6D show another embodiment of an entitlement control message. Here, one ECM 674 is created, and includes multiple keys corresponding to multiple time periods. In FIG. 6C, each encrypted key may correspond to a monthly time period, for example. In FIG. 6D, ECM 675 has key information encrypted under several keys. Key 684 is the current group or service key. Keys 685, 686 are time keys. They are not based on the same time epoch as the group or service key, but instead are used for retrieval of stored content after the most recent epoch or epochs have expired. A time key may be a vintage key. A vintage key may unlock all material from a particular group or service after a certain amount of time has elapsed, for example, two or three years. This reduces the number of fields of encrypted key information, therefore, ECMs could be made shorter to conserve bandwidth.

Figure 6E:
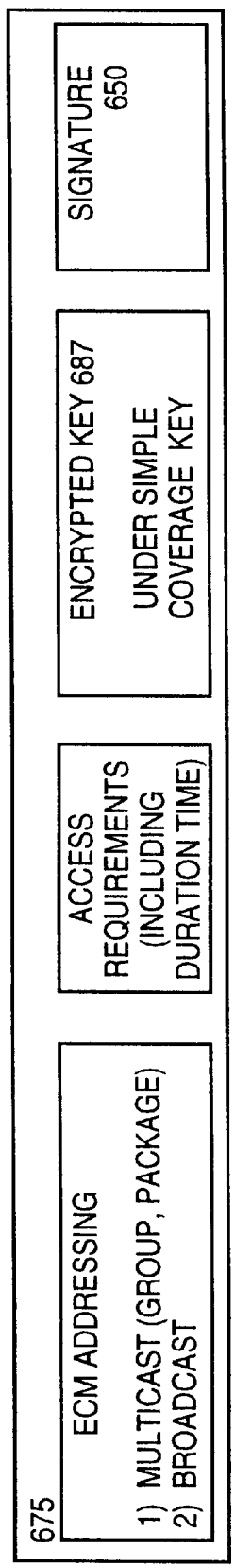

FIG. 6E shows another embodiment of the format of an entitlement control message 675. This relies on a simple coverage key 687 that either never changes unless there is a security problem or break, or changes extremely slowly, for example, on the order of years. The ECM access requirements 631 contain all the necessary information in order to recover the program. This format may rely on the ECM signature 650 to verify that none of the access conditions have been modified. This embodiment may benefit from public key cryptography, where the key used to decrypt or verify is not the key used to encrypt or sign messages. A conditional access element that has been compromised and thoroughly analyzed would not necessarily break the system for all conditional elements. The public key system would need to be broken as well. In the case of public key cryptography, the simple coverage key might not be required, as the key field along with other data could be encrypted with the signature.

Figure 7B:
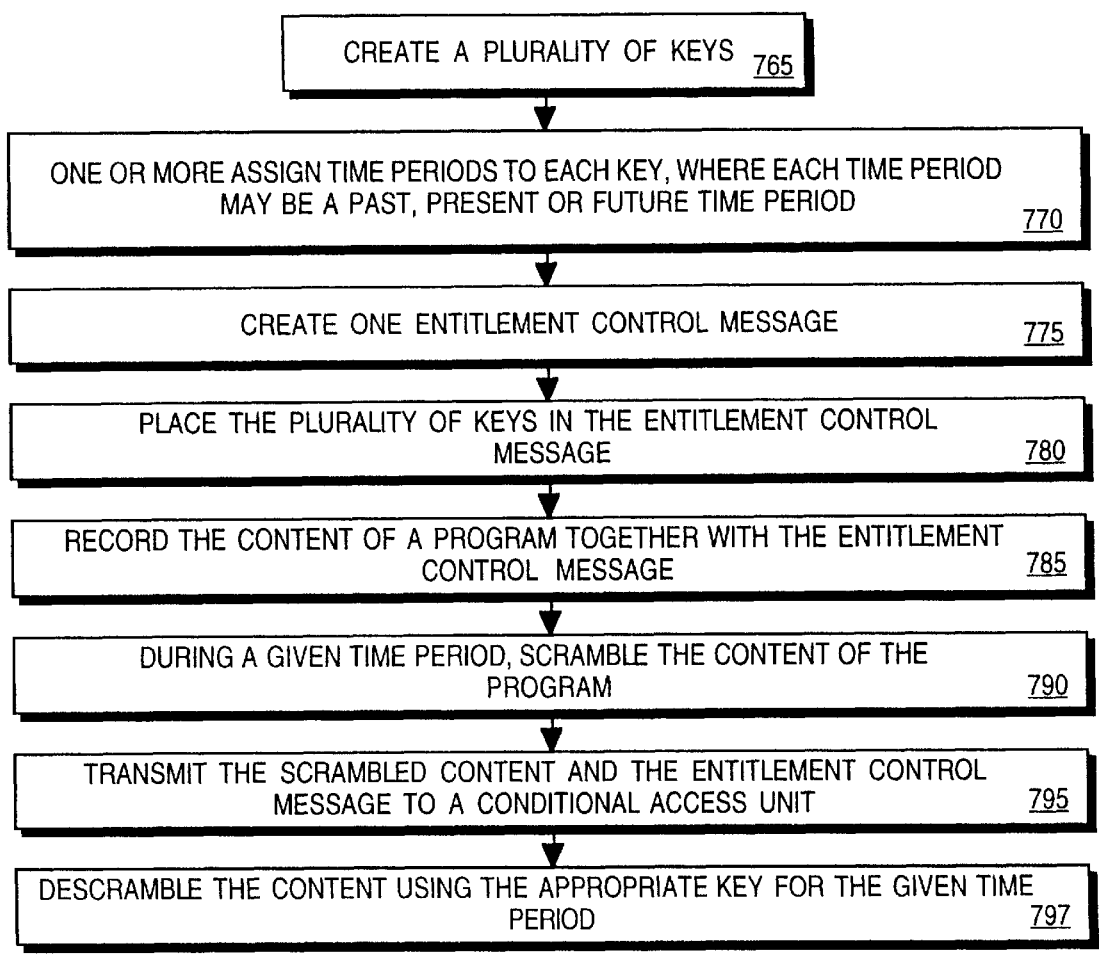

FIG. 7B shows a flow diagram of a method for creating one entitlement control message with a plurality of keys. In step 765, a plurality of keys are created. One or more time periods are assigned to each key, where each time period may be a past, present or future time period, 770. Create one entitlement control message, step 775. The plurality of keys are placed in the entitlement control message, 780. The content of a program is recorded together with the entitlement control message, 785. During a given time period, the content of a program is scrambled. The scrambled content is transmitted, or delivered to a user, 790, along with the ECM, by delivering the content to a conditional access unit. Transmit the scrambled content and the entitlement control message to a conditional access unit, step 795. The content is descrambled using the appropriate key for the given time period from the ECM, 797.

Figure 8A:
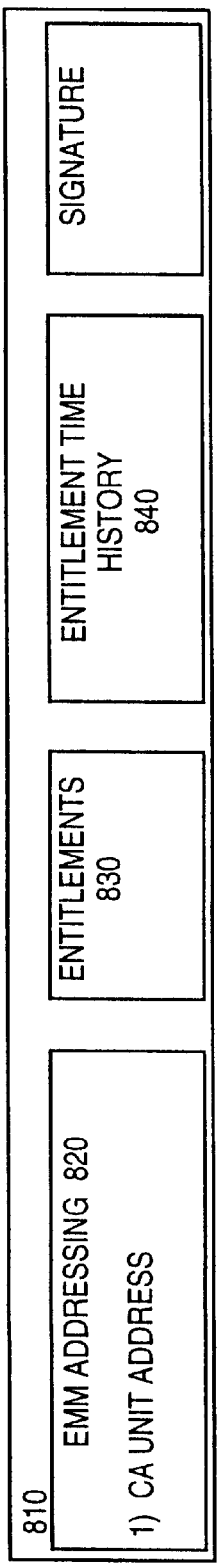
FIGS. 8A, 8B, and 8C show embodiments of entitlement management messages that include entitlement history.

The present invention may also track entitlements over time. For example, a new customer may be currently subscribed to a service, and is therefore entitled to view content delivered during the current billing period. However, the customer may not be authorized by the service to view content from previous periods. Therefore, if the service provider does not want a customer to have access to previously recorded content unless the customer pays for it, then the entitlement history of the customer has to be tracked. Information on whether a subscriber was authorized to view a service or package can be delivered in entitlement management messages, along with other entitlement information, as shown in FIG. 8A. ECM 810 includes information about entitlements that the customer currently has, in field 830, as well as the customer's entitlement time history 840.

Figure 8B:
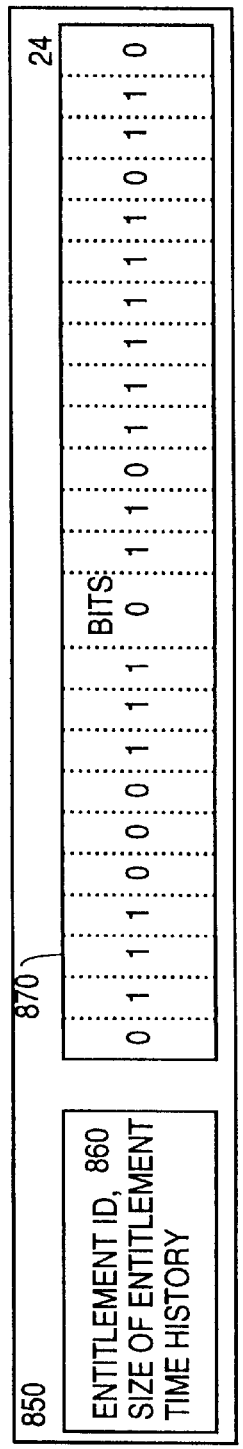

FIG. 8B shows one embodiment of an entitlement management message 850 that tracks a user's entitlement history in field 870. This entitlement time history may be delivered along with key and entitlement information. Each bit shown in the entitlement time history field 870 represents whether or not a customer was subscribed or authorized for a service for one or more discrete time periods. Thus, the first bit shown in FIG. 8B may represent whether a customer has access to content recorded 24 months ago. If this bit is in a first state, which may be zero, for example, then the customer may not view content from this time period, even if the customer has the key information for this time period. The memory required to store the entitlement time history information can be reduced using this method. For example, two years worth of information, with each bit representing one month, would only require 24 bits or 3 bytes of storage along with the header 860.

Figure 8C:
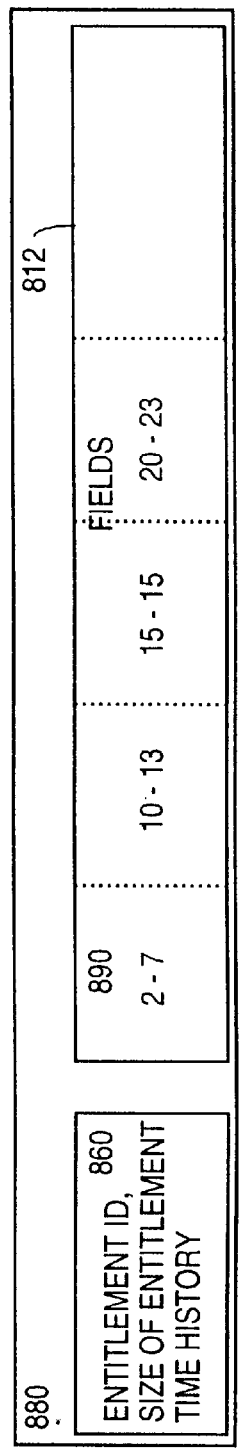

FIG. 8C shows an alternative embodiment of the entitlement management message 880. The entitlement time history information has several fields, where each field may correspond to several time periods. For example, if the first bit 890 represents whether a customer has had access at any time during a five month period, the memory required to store the entitlement history information is reduced.

Figure 10:
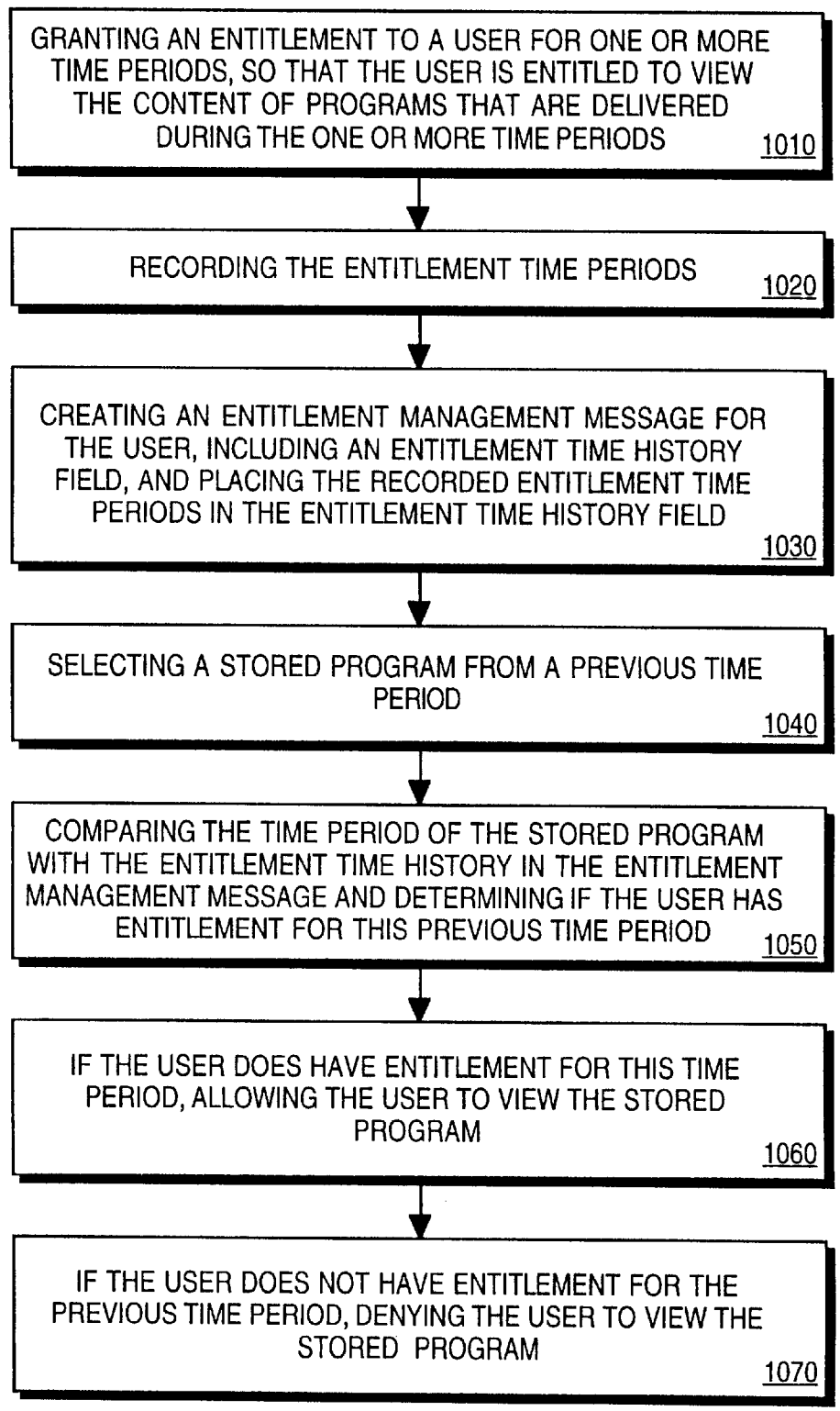
FIG. 10 shows an embodiment of a method to determine if a user is entitled to view a program that was delivered during a previous time period.

FIG. 10 shows one embodiment of a method for tracking the entitlement time history of a user. An entitlement is granted to a user for one or more time periods, so that the user is entitled to view the content of programs that are delivered during the one or more time periods, 1010. These entitlement time periods are recorded, 1020. An entitlement management message is created for the user, including an entitlement time history field, and the recorded entitlement time periods are placed in the field, 1030. A user may select a stored program that was delivered or transmitted during a previous time period, 1040. The time period of the stored program is compared with the entitlement time history in the entitlement management message and determines if the user is entitled to view a program that was delivered during the previous time period, 1050. If the user does have entitlement to view programs from this time period, the user is then allowed to view the selected program, 1060. If the user does not have entitlement to view programs from this previous time period, the user is denied access to viewing the stored program, 1070.

FIGS. 9A through 9D show embodiments for authorizing access to stored digital programs. Entitlements to view content recorded in the past may be granted to a customer. Thus, access to past content can be a service that is offered to a customer. For example, a server or recorder may record all programs that are broadcast during one day. Then, when a customer comes home from work, the customer can access the server to view the recorded content. A universal time counter will increment and identify the recorded program as "old" content. If it is old, then it is recorded on a medium such as a tape. A secondary conditional access element may then handle the stored content.

If the content is old, a screen may be displayed to the user so that the user can authorize and pay to view the content, as shown in FIGS. 9A through 9C. In FIG. 9A, the user is notified that he or she is not authorized to view old content. The user may then receive authorization to view old content, by responding to a query, for example. In FIG. 9B, if a user is not authorized to view a program, the user may receive authorization by paying to view the program. The user may also receive authorization to view the program by subscribing to the time period when the program content was broadcast, or delivered, to customers. In FIG. 9C, the customer may receive access to view a program by subscribing to one of several past time periods, all of which include the program that the customer wishes to view.

FIG. 9D shows one embodiment of displaying entitlement history to a customer. A grid includes several time periods and a list of services or content. The time periods may be in a row, for example, and the services may be in a column. Thus, whether a customer is authorized to view content that was broadcast or delivered during a given time period can be easily determined by viewing the grid. For example, if box in grid is in a first state, then the customer is not authorized to view content from the Disney channel that was delivered between July and December of 2000. If the customer desires to view content from this service that was delivered during this time period, then delivery of past entitlements can be sent to the customer to retrieve stored programs. Thus, the customer can pay to fill in the fields of FIG. 9D. This allows selective enablement of past stored programs.

Figure 11:
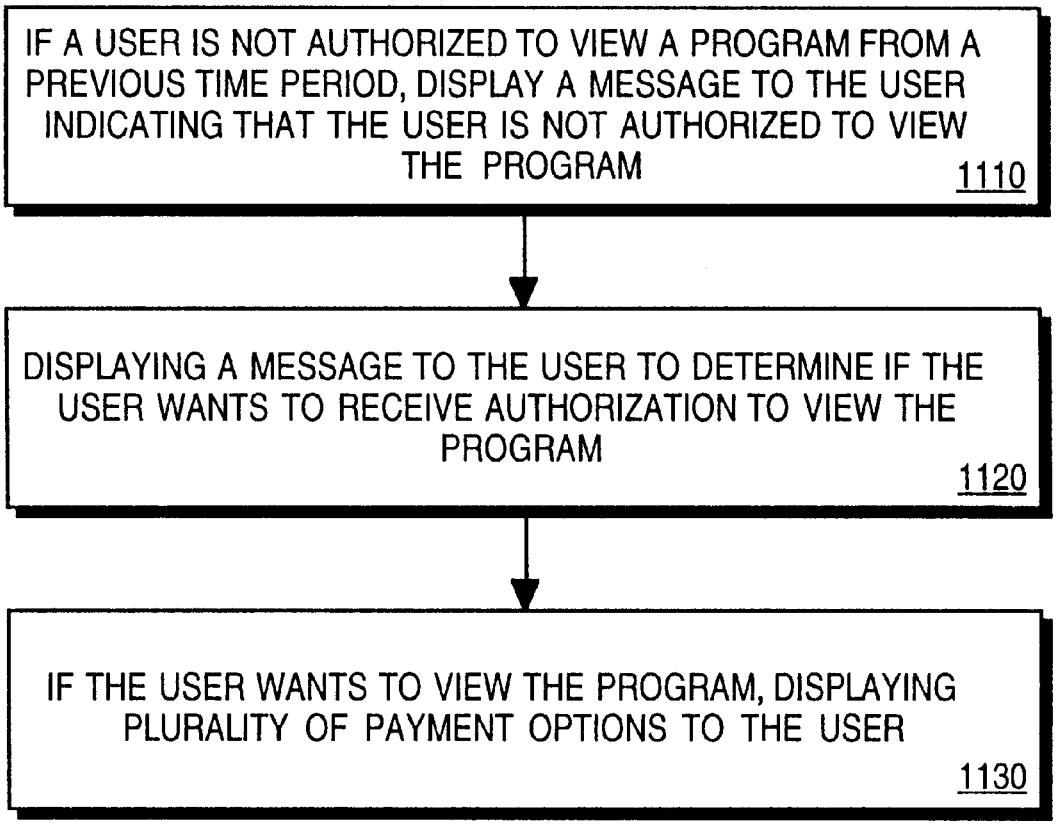
FIG. 11 shows an embodiment of a method for allowing a user to obtain authorization to view program content from a previous time period.

FIG. 11 shows an embodiment of a method to obtain authorization to view content recorded or delivered during a previous time period. If a user is not authorized to view a program from a previous time period, a message is displayed to the user that indicates that the user is not authorized to view the program, 1110. A message is displayed to the user to determine if the user wants to receive authorization to view the program, 1120. If the user responds affirmatively, for example by inputting a response to the set top box using a computer input device, then a plurality of payment options are displayed to the user, 1130. The user then pays for the stored program from a previous time period by selecting one of the payment options, and authorization for the user to view the program is granted.

What is claimed is:

1. A method for deriving at least one key of a plurality of keys used to descramble scrambled data comprising:
   receiving the scrambled data at a conditional access device;
   receiving at least one of the keys of the plurality of keys and a one way function at the conditional access device, wherein the plurality of keys are related to each other in an ordered sequence based on the one way function;
   deriving at least one additional key from the received key and the one way function without requiring storage of multiple keys;
   using the additional key to descramble the received scrambled data in the conditional access device; and
   after a predetermined time period, deriving another key using the additional key and the one way function.

2. The method of claim 1, wherein the ordered sequence of keys starts with a first key and ends with a last key.

3. The method of claim 1, wherein the one way function and a given key in the ordered sequence can derive previous keys in the ordered sequence.

4. The method of claim 3, wherein the previous keys that can be derived include the keys from the first key to the given key.

5. The method of claim 1, wherein the one way function and a given key in the ordered sequence cannot derive subsequent keys in the ordered sequence.

6. The method of claim 5, wherein the subsequent keys that cannot be derived include all keys following the given key in the ordered sequence, up to and including the last key.

7. The apparatus of claim 5, wherein the subsequent keys that cannot be derived include all keys following the given key in the ordered sequence, up to and including the last key.

8. An apparatus for deriving at least one key of a plurality of keys used to descramble scrambled data comprising:
   a receiver configured to receive the scrambled data at a conditional access device, and configured to receive at least one of the keys of the plurality of keys and a one way function at the conditional access device, wherein the plurality of keys are related to each other in an ordered sequence based on the one way function; and
   a processor connected to the receiver, the processor configured to derive at least one additional key from the received key and the one way function, configured to use the additional key to descramble the received scrambled data in the conditional access device wherein storage of multiple keys is not required; and
   to derive another key using the additional key and the one way function after a given time period has expired.

9. The apparatus of claim 8, wherein the ordered sequence of keys starts with a first key and ends with a last key.

10. The apparatus of claim 8, wherein the processor is configured to use the one way function and a given key in the ordered sequence to derive previous keys in the ordered sequence.

11. The apparatus of claim 8, wherein the one way function and a given key in the ordered sequence cannot derive subsequent keys in the ordered sequence.

12. The apparatus of claim 11, wherein the previous keys that can be derived include the keys from the first key to the given key.

13. An apparatus for deriving at least one of a plurality of keys used to descramble scrambled data comprising:
   means for receiving the scrambled data at a conditional access device;
   means for receiving at least one key of the keys of the plurality of keys and the one way function at the conditional access device, wherein the plurality of keys are related to each other in an ordered sequence based on the one way function;
   means for deriving at least one additional key from the received key and the one way function, wherein storage of multiple keys is not required;
   means for using the additional key to descramble the received scrambled data in the conditional access device; and
   means for deriving another key using the additional key and the one way function.

14. A computer readable medium containing executable instructions, which, when executed in a processing system, causes the system to perform the steps for deriving at least one key of a plurality of keys used to descramble scrambled data comprising:
   receiving the scrambled data at a conditional access device;
   receiving at least one of the keys of a plurality of keys and a one way function at the conditional access device, wherein the keys are related to each other in an ordered sequence based on the one way function;
   deriving at least one additional key from the received key and the one way function, wherein storage of multiple keys is not required;
   using the derived key to descramble the received scrambled data in the conditional access device; and
   after a predetermined time period, deriving another key using the additional key and the one way function.

* * * * *